US010330938B2

(12) United States Patent
Cheng et al.

(10) Patent No.: US 10,330,938 B2
(45) Date of Patent: Jun. 25, 2019

(54) WAVEGUIDE OPTICAL ELEMENT AND NEAR-EYE DISPLAY APPARATUS

(71) Applicant: Beijing NED+AR Display Technology Co., Ltd., Beijing (CN)

(72) Inventors: Dewen Cheng, Beijing (CN); Qiwei Wang, Beijing (CN)

(73) Assignee: Beijing NED+AR Display Technology Co., Ltd., Beijing (CN)

( * ) Notice: Subject to any disclaimer, the term of this patent is extended or adjusted under 35 U.S.C. 154(b) by 0 days.

(21) Appl. No.: 15/867,235

(22) Filed: Jan. 10, 2018

(65) Prior Publication Data

US 2018/0246333 A1 Aug. 30, 2018

(30) Foreign Application Priority Data

Feb. 24, 2017 (CN) .......................... 2017 1 0104603
Feb. 24, 2017 (CN) ..................... 2017 2 0172343 U

(51) Int. Cl.
*G02B 27/01* (2006.01)
*F21V 8/00* (2006.01)

(52) U.S. Cl.
CPC ....... *G02B 27/0172* (2013.01); *G02B 6/0055* (2013.01); *G02B 6/0018* (2013.01); *G02B 6/0025* (2013.01); *G02B 6/0076* (2013.01); *G02B 2027/0123* (2013.01); *G02B 2027/0125* (2013.01)

(58) Field of Classification Search
CPC .............. G02B 27/017; G02B 27/0093; G02B 27/01701; G02B 27/0172; G02B 27/4227; G02B 2027/0112; G02B 2027/0123; G02B 2027/0127; G02B 2027/0178
See application file for complete search history.

(56) References Cited

U.S. PATENT DOCUMENTS 8,403,490 B2 * 3/2013 Sugiyama .......... G02B 27/0172 345/8
9,395,544 B2 * 7/2016 Luttmann .......... G02B 27/0172
2013/0322810 A1 * 12/2013 Robbins ................... G02B 5/30 385/11
2014/0071539 A1 * 3/2014 Gao .................. G02B 27/0025 359/630
2015/0146185 A1 * 5/2015 Williamson ....... G02B 17/0816 355/67

* cited by examiner

*Primary Examiner* — Sultan Chowdhury
(74) *Attorney, Agent, or Firm* — Syncoda LLC; Feng Ma

(57) ABSTRACT

A light-weight and ultrathin waveguide optical element having a large field of view includes two or more layers of waveguide plates provided to be overlapped with each other. Within each layer of the waveguide plate are included multiple reflective surfaces with different reflectivity, such that light transmitted through the waveguide plate has a substantially uniform distribution of intensity in a predetermined area when exiting from the waveguide plate. The waveguide optical element is ultrathin such that it can be directly mounted into a spectacle frame. Use of the waveguide optical element with a projection optical assembly can improve user experience as well as display effect with good contrast.

19 Claims, 9 Drawing Sheets

MD1 16 16 MD2
13
14
11a
11b
11c
11d
11e
11
15
12a
12b
12c
12d
12e
12

WAVEGUIDE OPTICAL ELEMENT AND NEAR-EYE DISPLAY APPARATUS

CROSS-REFERENCE TO RELATED APPLICATIONS

The present application claims priority to CN 201720172343.5 and CN 201710104603.X, both filed on Feb. 24, 2017. The disclosures of these applications are hereby incorporated by reference in their entirety.

BACKGROUND

A head-mounted display (HMD) device, through an optical system, augments images from an image source and presents the images in front of a user's eyes, displaying different visual effects according to different applications, such as 3D display, augmented reality application, etc. Because the images typically only enter the user's eyes of his/her own, the head-mounted display device, compared with conventional displays, has better privacy. As technologies of virtual reality (VR) and augmented reality (AR) develop rapidly, HMDs are receiving more and more attention because of their huge market values and development potentials.

SUMMARY

A transmission-type near-eye display (NED) is a small-sized photoelectric display apparatus worn in front of eyes of a user to provide visible virtual images for the wearer and meanwhile not to influence the user to observe the outside real scenes. The transmission-type NED produces computerized virtual image signals through a micro-display, which then enter human eyes after being coupled by projection technology; meanwhile images of outside real scenes enter human eyes by means of technologies of optical transmission-type or video transmission-type, thereby achieving the combination of virtual signals and real scenes. Because no obstruction of sight in use of the optical transmission-type near-eye display system makes users' observation of outside scenes not affected, while they are watching virtual scenes, the system has a great prospect of being applied to many fields such as military applications, scientific research, augmented reality, industrial assembly and maintenance, simulated training, healthcare, navigation, 3D display, and entertainment, and also provides huge socioeconomic benefits.

With the growth of the technology, on the basis that the near-eye display optical system meets basic requirements for optical property, the transmission-type NED is developing towards having great field angle, high resolution, and ultrathin and lightweight structure, and users' experience is receiving more and more attention as well. To achieve great field angle and ultrathin and lightweight structure of the optical system, conventional rotationally-symmetric multiple-plates systems are gradually replaced with technologies like free-form curved surface prisms and diffractive optical elements. The inventors of the present disclosure have recognized that, due to the thickness usually not less than 10 mm, such technologies remain unable to satisfy users' demand for ultrathin and lightweight structure; and additionally, in the above technologies universally exist problems like smaller exit pupil diameter and smaller range of users' eye movement (usually not greater than 8 mm), which adversely affect users' wearing experience.

The planar waveguide optical element may use total internal reflection transmission of light to dramatically reduce thickness of the transmission-type near-eye device, and use a coupling exit end to achieve a larger exit pupil diameter. However, there are certain restrictions in the aspect of field angle. For example, some researchers note that due to influences exerted by geometric construction, ghost image and stray light, the geometrically planar waveguide with the beam-split surface array as shown in FIG. 1 may have a field angle as largest as 40° when maintaining a relatively thin thickness.

The present disclosure relates to a planar waveguide optical element for a transmission-type near-eye display apparatus as well as a near-eye display apparatus using the same, specifically, relating to a waveguide element structure for improving the field angle of the transmission-type near-eye display apparatus with a smaller thickness by utilizing the technologies of transmission-type near-eye display and splicing fields of views.

Various embodiments of the present disclosure provide a waveguide optical element adaptive to a transmission-type near-eye display apparatus, and a near-eye display apparatus using the same, and provides an optically technical solution by splicing waveguide optical elements to achieve an ultra-thin profile, a large field of view, large exit pupil diameter and distance, and non-stray light.

The waveguide optical element according to some embodiments of the present disclosure comprises at least two waveguide plates arranged to overlap in parallel with a predetermined gap therebetween, each waveguide plate comprising two main surfaces parallel to each other, and transmitting light coupled into the waveguide plates in a predetermined direction by means of total internal reflection; and at least one partially reflective surface respectively located inside each of the waveguide plates, and arranged within a space between the main surfaces as a beam-split surface at a characteristic angles with the main surfaces; wherein the partially reflective surfaces inside the waveguide plates are distributed in different areas along the direction of the main surfaces.

In some embodiments, there are a plurality of the partially reflective surfaces inside each of the waveguide plates, and numbers of the partially reflective surfaces inside the waveguide plates are identical or different.

In some embodiments, the plurality of the partially reflective surfaces are distributed uniformly in a predetermined distribution area.

In some embodiments, the apparatus can further include coupling incidence portions integral with or combined with the waveguide plates into a whole, the coupling incidence portions are used for deflecting light beams toward the waveguide plates such that light entering the waveguide plates satisfies an incidence condition of total internal reflection.

The coupling incidence portions are located on the same side of the respective waveguide plates, and protrude from the waveguide plates in the same direction; or, the coupling incidence portions are located on different sides of the respective waveguide plates, and protrude from the waveguide plates in different directions.

In some embodiments, an angle between the partially reflective surface and the main surfaces in a first waveguide plate is different from an angle between the partially reflective surface and the main surfaces in a second waveguide plate.

In some embodiments, a distance PAB between an upper boundary point A of the partially reflective surfaces in one of the waveguide plates and a lower boundary point B of the partially reflective surfaces in another waveguide plate along the direction of the main surfaces of the waveguide plates satisfies the following formula:

$$P_{AB} \geq EPD + 2ERF \times \tan(FOV/2) + \frac{D}{n}\tan(FOV/2)$$

EPD is an exit pupil diameter, ERF is an exit pupil distance, FOV is a field angle that may be achieved by the waveguide optical element, n is a refractivity of the waveguide plate, and D is a thickness of the waveguide optical element.

The plurality of the partially reflective surfaces can have different reflectivity to ensure that light exiting from the waveguide plates has a substantially uniform distribution of intensity in a predetermined area, the reflectivity of adjacent partially reflective surfaces meets the following formula:

$$R_N = \frac{R_{N-1}}{1 - R_{N-1}}$$

N is a sequence number of the partially reflective surfaces, R1 is reflectivity of the partially reflective surface closest to the coupling incidence portion.

The number of the beam-split surfaces in each waveguide plate is 5-7 according to some embodiments.

According to some embodiments, a waveguide plate away from an exit pupil side has the smallest thickness, while a waveguide plate close to the exit pupil side has the largest thickness, and the distribution of characteristic angles of the beam-split surfaces in the waveguide plates match the thickness of the respective waveguide plates.

According to some embodiments, the dimensions of the coupling incidence portions of a first waveguide plate and a second waveguide plate fit their own characteristic angles.

According to some embodiments, the coupling incidence portions include a deflecting prism.

According to some embodiments, the characteristic angles in the waveguide plates are less than 30°.

According to some embodiments, the total thickness of the waveguide optical element is no more than 5 mm.

In another aspect a near-eye display apparatus is provided, using the above waveguide optical element. The apparatus can include a housing, a projection optical assembly and a micro-display, wherein the projection optical assembly is provided inside the housing for projecting image light emitted from the micro-display to the waveguide optical element, so as to transmit in the waveguide optical element.

The at least two waveguide plates share a same projection optical assembly, or different waveguide plates respectively match different projection optical assemblies.

As an example, the projection optical assembly at least has four lenses, the at least four lenses include a doublet lens and an aspheric lens. In some other embodiments, in the situation of multiple waveguide plates, a laser scanning projection optical assembly is used.

The micro-display can be or include one of more of LCD, OLED, LCoS, or DLP micro-displays.

In another aspect, a method of displaying augmented reality (AR) or virtual reality (VR) images with a wearable display apparatus is provided, the method including: receiving images; projecting the images to a waveguide optical element through a projection optical assembly, wherein the waveguide optical element includes at least two waveguide plates arranged to overlap in parallel with a predetermined gap therebetween; and at least one partially reflective surface respectively located inside each of the waveguide plates, the partially reflective surfaces inside the waveguide plates are distributed in different areas in the respective waveguide plates; and coupling light of the images through the partially reflective surfaces to exit to an exit pupil position of the waveguide optical element.

For the waveguide optical element according to some embodiments, through at least two layers of waveguide plates arranged to be overlapped, the beam-split surface arrays within each layer have different structure parameters, which can respectively influence the fields of views of different angle ranges, and also guarantee a larger field angle, an image within effective field of view to have a relatively uniform intensity of light, less stray light, and an exit pupil diameter at least to be up to over 10 mm under the circumstance that the thickness gets limited increase relative to a single layer waveguide, thereby acquiring a better AR experience while the overall weight is relatively light.

DETAILED DESCRIPTION

The following description, with reference to the accompanying drawings, particularly describes some embodiments of the subject invention to make explanation therefor, wherein the same reference signs are consistently used to denote the same parts. Unless expressly stated otherwise, those skilled in the art should understand that terms like first, second, left and right are just considered to distinguish different parts in different positions, instead of containing necessarily restrictive functions.

Figure 1:
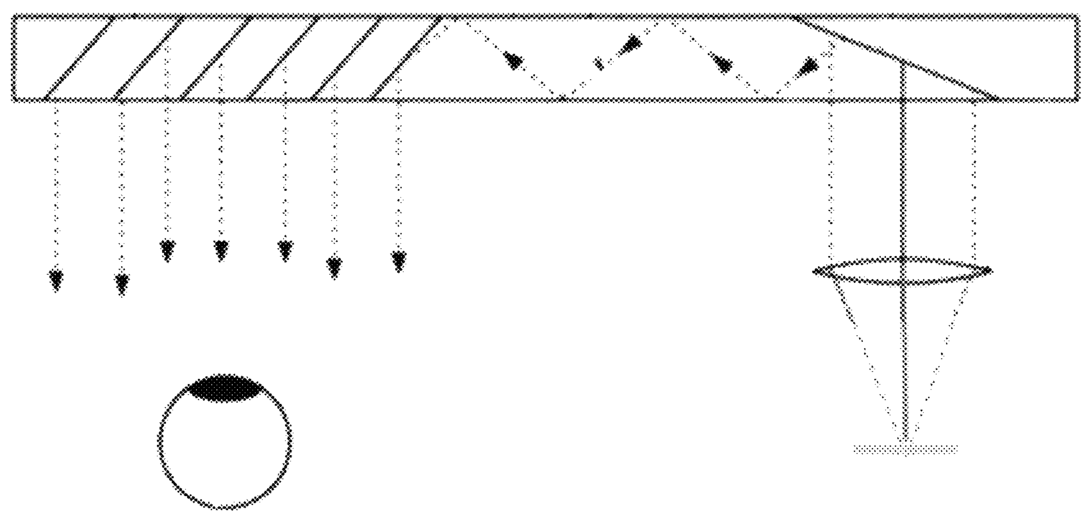
FIG. 1 is a structure diagram of a geometrically planar waveguide with a beam-split surface array in the prior art.
Figure 2:
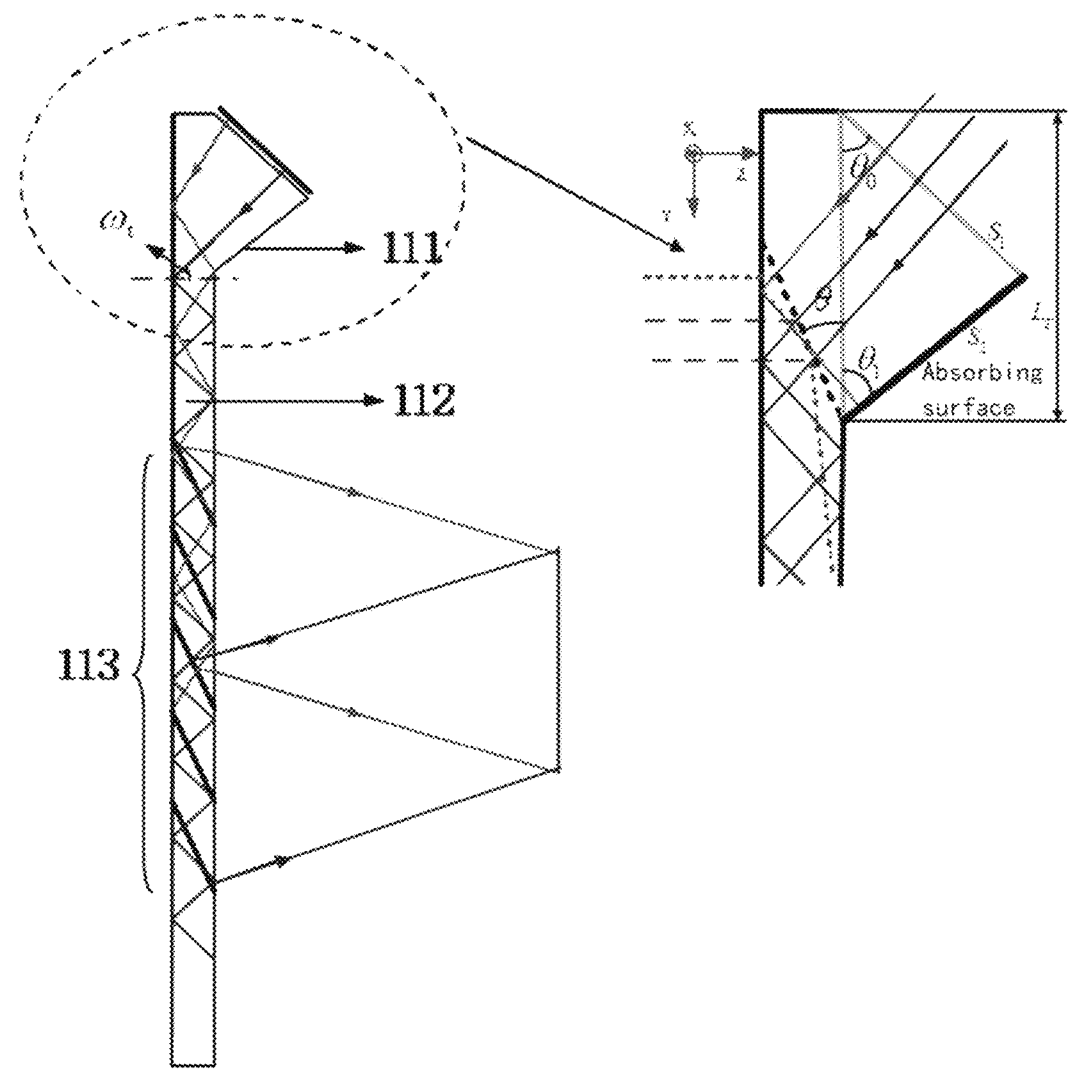
FIG. 2 is an optical path diagram of a waveguide optical element having a single layer of waveguide plate.

With respect to a beam-split surface and a coupling incidence portion in a single layer waveguide, FIG. 2 shows the optical path diagram of a waveguide optical element comprising only a single layer of waveguide plate, wherein light is coupled into the waveguide optical element through a coupling incidence portion 111 of the waveguide optical element (i.e. the single layer of waveguide plate), meets a condition of the total reflection inside the waveguide optical element 112, and is reflected on an exit beam-split surface array 113 after several times of total reflection transmission, wherein each exit beam-split surface is a partially reflective surface covered with an optical membrane having a certain splitting ratio on the surface thereof, thus partial light is reflected, thereby exiting from the waveguide optical element and entering human eyes for imaging. To meet the requirement for efficiency of light energy utilization and expansion of exit pupil, it is relatively suitable to keep the number of such beam-split surfaces in the entire waveguide optical element to be 3-7; preferably, 5-6 of such beam-split surfaces may produce a better effect. To facilitate manufacture, the beam-split surfaces are preferably parallel and equally spaced with each other. In the structure of the coupling incidence portion 111, in order to satisfy the demand for coupling function and uniform distribution of light in human eyes (i.e. exit pupil position), characteristic angles $\theta_0$, $\theta_1$, and $L_T$ of the coupling incidence portion need to satisfy the following conditions:

$$\begin{cases} \theta_0 = 2\theta \\ \theta_1 \geq \frac{\pi}{2} - \omega_t \\ L_T \geq 2d \tan\omega_t \end{cases} \quad (1)$$

Wherein, θ represents a characteristic angle of the beam-split surface, and $\omega_t$ is the angle at which the light beam travels inside the waveguide optical element. The characteristic angle θ needs to satisfy the following two conditions:

(A) ensuring that light transmission inside the waveguide can satisfy the condition of the total reflection, wherein the critical angle of the total reflection is θc $$90° > \omega_t > \theta_c \quad (2)$$

(B) separating the stray light from the normal imaging light, and deviating the stray light from the exit pupil of the system.

Both modes of increasing and reducing θ can deviate the stray light from the exit pupil position of the system. However, accordingly, with the same thickness and the same number of beam-split surfaces, exit pupil diameter obtained by adopting the mode of increasing θ is smaller than that by adopting the mode of reducing θ; reduction of θ may restrict the field angle to some extent; while increase of θ may result in a larger size of the coupling incidence portion when meeting the requirement for light uniformity within the exit pupil range.

With the same thickness of the waveguide plates and the same number of beam-split surfaces, use of a smaller angle θ in both waveguide plates can easily achieve a higher field angle, and ensure a larger exit pupil diameter at the same time. Nevertheless, the skilled in the art can understand that, not limited to the above, a solution of combining one larger than 30° with the other smaller than 30° can also be applied to characteristic angles of the beam-split surfaces in both waveguide plates, or a solution of both larger than 30° may be feasible as well. Accordingly, by using solutions of different characteristic angles of the beam-split surfaces, the largest field angle to be achieved may be slightly different. Besides, use of materials with higher refractivity can increase the field angle of the waveguide optical element.

Example 1

Figure 3A:
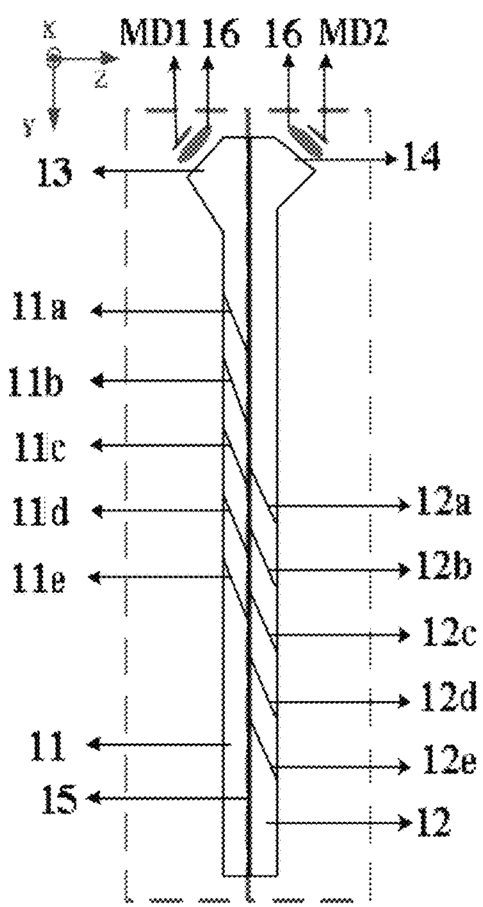
FIG. 3A illustrates a waveguide optical element according to some embodiments in a first example.

As shown in FIG. 3A, a waveguide optical element according to some embodiments two layers of waveguide plates 11 and 12 placed in the manner of superposition, specifically in the coordinate XYZ as shown in the figure, each waveguide plate 11, 12 comprising two main surfaces parallel to each other, and the two main surfaces extending along XY plane of the coordinate; wherein the first waveguide plate 11 comprises five coupling exit beam-split surfaces and is attached with a coupling incidence portion 13; likewise, the second waveguide plate 12 is attached with a coupling incidence portion 14, and comprises five coupling exit beam-split surfaces; main surfaces of the first and the second waveguide plates is parallel to each other, and a tiny air membrane layer 15 exists between adjacent main surfaces of the first waveguide plate 11 and the second waveguide plate 12. Micro-displays MD1 and MD2 which can be LCD, OLED, LCoS or DLP are respectively used as image source elements of the first waveguide plate and the second waveguide plate, the image light coming from them, through the projection optical assembly of their own, respectively enters the coupling incidence portion 13 attached (e.g. by means of adhesion) to the main surface on one side of the first waveguide plate 11 as well as the coupling incidence portion 14 attached to the main surface on one side of the second waveguide plate 12, wherein the coupling incidence portions 13 and 14 extend along the main surfaces in the direction of X and demonstrate a substantially triangular section in the YZ plane.

Figure 3B:
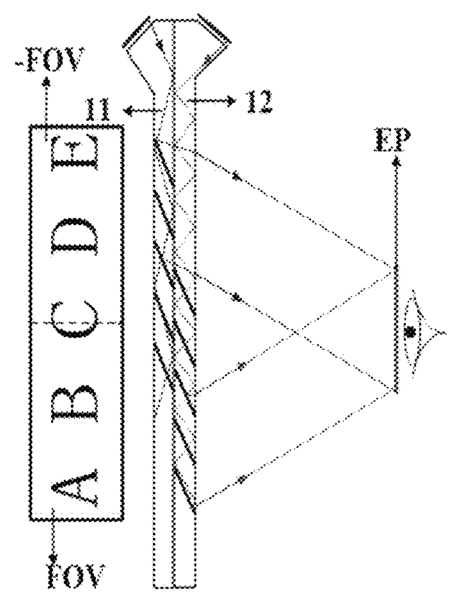
FIG. 3B illustrates an operation of a waveguide optical element according to some embodiments.

In some example modes, as shown in FIG. 3A and FIG. 3B, vertex angles of the two coupling incidence portions are oriented in different directions, namely, the coupling incidence portions are not located on the same side of the two waveguide plates, protruding from the waveguide plates in different directions, thereby making image light (usually collimated light) emitted through the projection optical assembly able to be coupled through the coupling incidence portions respectively into the first waveguide plate 11 and the second waveguide plate 12 for transmission, and after several times of total reflection, subsequently be coupled to exit through the coupling exit beam-split surfaces 11*a*-11*e* and 12*a*-12*e* inside each waveguide plate, and finally reach the exit pupil position EP to enter human eyes of a user and form an image.

Because it may need to rely on multiple coupling exit beam-split surfaces for coupling and exit of light, in order to achieve uniformity of exit images, in the example, the beam-split surfaces are distributed regularly in the distribution area, as shown in FIG. 3B, wherein each beam-split surface is coated with a beam-split membrane, and reflectivity of each beam-split membrane increases as the position of the beam-split surface in Y direction is gradually away from the coupling incidence portion. Such method may effectively improve uniformity of illumination brightness within the exit pupil range, and the reflectivity R of membranes on the adjacent beam-split surfaces can be expressed as formula (3):

$$R_N = \frac{R_{N-1}}{1 - R_{N-1}} \quad (3)$$

wherein N is a sequence number of the beam-split membranes, for example, $R_1$ is reflectivity of a beam-split membrane of the beam-split surface closest to the coupling incidence portion.

Figure 4A:
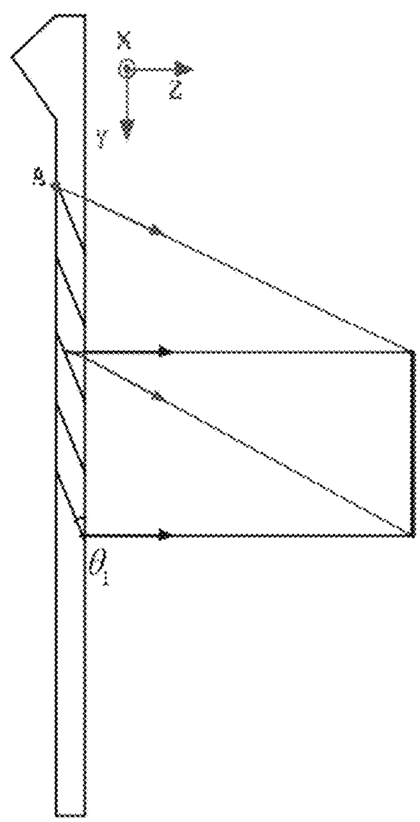
FIG. 4A is a disassembly diagram of a first layer of waveguide plates inside the waveguide optical element according to some embodiments in the first example.
Figure 4B:
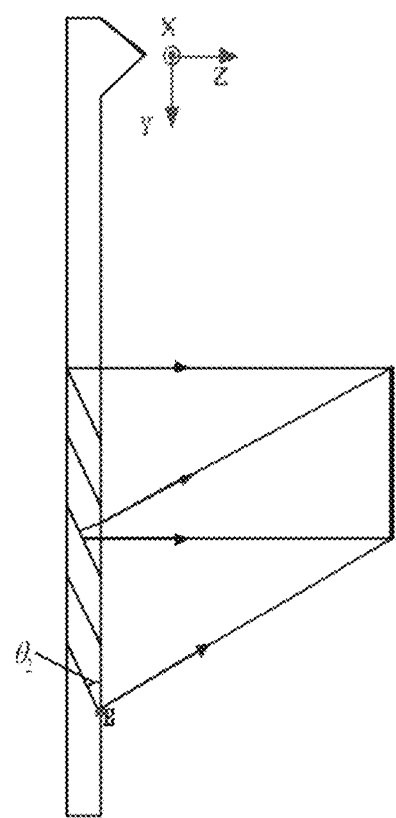
FIG. 4B is a disassembly diagram of a second layer of waveguide plates inside the waveguide optical element according to some embodiments in the first example.

As shown in FIG. 4A and FIG. 4B, in order for the light within the waveguide optical element to exit, it may need to destroy the condition of the total reflection for the light inside the waveguide plates. With a smaller characteristic angle $\theta_1$ between the coupling exit beam-split surface 11*a*-11*e* and the main surface, the smaller $\theta_1$ can effectively deviate the ghost image and stray light from the exit pupil, and be responsible for light beams within the field of view [−FOV/2, 0] in Y direction of the coordinate; and with a larger characteristic angle $\theta_2$ between the coupling exit beam-split surface and the main surface inside the second waveguide plate 12, the larger a can effectively increase the field angle, and be responsible for the light beams within the field of view [0, FOV/2] in Y direction of the coordinate.

This distribution makes the array constituted by beam-split surfaces 11*a*-11*d* inside the first waveguide plate 11 deviate towards −Y direction relative to the optical axis direction of human eyes, and makes the array constituted by beam-split surfaces 12*a*-12*d* inside the second waveguide plate 12 deviate towards +Y direction relative to the optical axis direction of human eyes. When the distribution areas of the beam-split surfaces in different waveguide plates are not identical and are staggered, it can ensure that the exit pupil diameter of full field of view is large enough, and there is less stray light. Regarding the distribution of beam-split surfaces in two waveguide plates, it can be defined according to a distance between distribution boundary points of beam-split surfaces in the waveguide plates, A to indicate an upper distribution boundary point of the beam-split surfaces 11*a*-11*d* in the first waveguide plate 11 (corresponding to the beam-split surface 11*a*), a to indicate a lower boundary point (corresponding to the beam-split surface 11*d*, referring also to FIGS. 3A and 3B); b to indicate an upper distribution boundary point of the beam-split surfaces 12*a*-12*d* in the second waveguide plate 12 (corresponding to the beam-split surface 12*a*), and B to indicate a lower boundary point (corresponding to the beam-split surface 12*d*). Under the distribution feature of beam-split surfaces in this example, distance $P_{AB}$ between Points A and B in Y direction satisfies formula (4).

$$P_{AB} \geq EPD + 2ERF \times \tan(FOV/2) + \frac{D}{n}\tan(FOV/2) \quad (4)$$

wherein EPD is the exit pupil diameter, ERF is the exit pupil distance, FOV is the field angle that may be achieved by the waveguide optical element, n is the refractivity of the waveguide plate, and D is the thickness of the waveguide optical element, a distance between points A and a ($P_{Aa}$), and a distance between points B and b ($P_{bB}$), both $<P_{AB}$.

Because the beam-split surfaces within two waveguide plates fail to coincide along the direction of Y in the distribution area within the respective waveguide plate, the image light from the micro-displays is respectively coupled to exit to different areas of field of view, thereby splicing and displaying the images of the two micro-displays MD1 and MD2 at the exit pupil position, which may remarkably increase the effective field angle and resolution ratio of image display.

Table 1-1 shows structure parameters of a specific waveguide plate according to the above embodiment, wherein the field angle is up to ±32° in the direction of waveguide expansion (Y direction), and at this time, internal stray light of the first waveguide plate cannot enter the exit pupil position; while the angle of internal stray light of the second waveguide plate is the closest to a normal field angle area at a field angle of 0°. Due to a lower distribution area of the array constituted by beam-split surfaces inside the second waveguide plate, stray light is deflected to leave the field of view, and cannot enter the exit pupil position. Therefore, little stray light is present in the entire field of view, and the effective filed angle can be up to 64°.

TABLE 1-1

| | Thickness d | Characteristic Angle θ | Refractivity n | Air Gap | ERF | EPD | FOV |
|---|---|---|---|---|---|---|---|
| 1st waveguide plate 11 | 1.68 mm | 19° | 1.7 | 0.02 | 20 mm | 10 mm | 64° |
| 2nd waveguide plate 12 | 2.3 mm | 27° | 1.7 | | | | |

Figure 5:
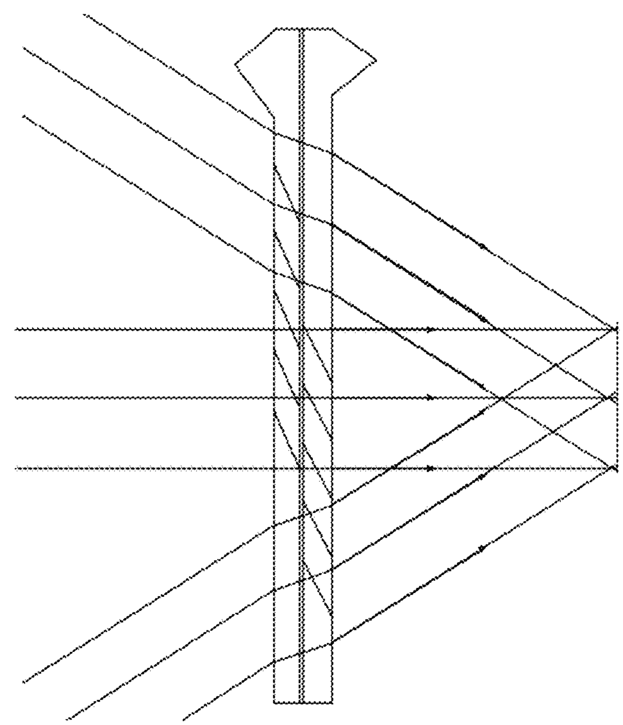
FIG. 5 is an optical path diagram, when external light is transmitting, of the waveguide optical element according to the first example.

FIG. 5 is an optical path diagram of the above embodiment when external light is transmitting. Since the non-adjacent outside surfaces of the two waveguide plates are planar and parallel to each other, the light in the direction of transmission entering a user's eyes may not be affected, and external light can transmit through the waveguide plates to form an image normally.

Figure 6:
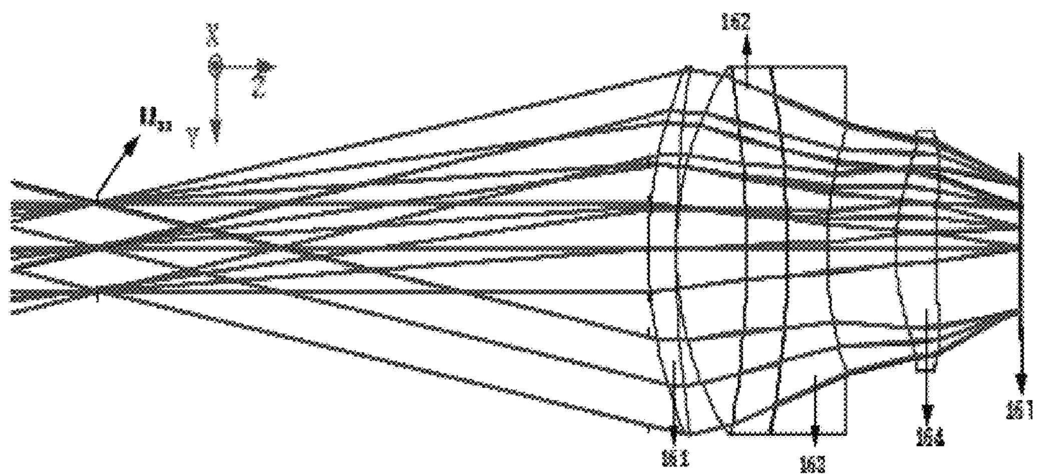
FIG. 6 is a diagram of a typical projection optical assembly adaptive to the waveguide optical element of the first example.

FIG. 6 is a diagram of a typical projection optical assembly 16 adaptive to the double-layer waveguide optical element of the first example. According to the overall optical path of the projection optical assembly shown in FIG. 6, it comprises a first lens, a second lens, a third lens and a fourth lens 161-164, wherein the second lens 162 is a doublet lens, the fourth lens 164 is a tenth-order aspheric lens, the first lens 161 has a negative focal power, the third lens 163 has a positive focal power, and an image surface position 167 is the position of the micro-display. Parameters of each optical surface of the projection optical assembly may be illustrated by Tables 1-2 and 1-3, and from the first lens to the fourth lens, surfaces are successively labeled as 3, 4, 5 . . .

TABLE 1-2

| Surface Sign | Surface Type | Radius | Thickness |
|---|---|---|---|
| Diaphragm XOZ | spherical | ∞ | 40 |
| Diaphragm YOZ | spherical | ∞ | 0.1 |
| 3 | spherical | 17.299 | 1.782 |

TABLE 1-2-continued

| Surface Sign | Surface Type | Radius | Thickness |
|---|---|---|---|
| 4 | spherical | 47.383 | 0.01 |
| 5 | spherical | 11.900 | 4.97 |
| 6 | spherical | −28.790 | 2.6 |
| 7 | spherical | −32.791 | 0.01 |
| 8 | spherical | −34.714 | 1.602 |
| 9 | spherical | 12.356 | 3.342 |
| 10 | aspheric | 6.986 | 2.594 |
| 11 | aspheric | 2612.337 | 4.621 |
| Image | spherical | ∞ | −0.100 |

Surface 10 and surface 11 are aspheric surfaces of the fourth lens 164, and the aspheric surface equation is expressed as the following formula (5), each coefficient shown as in Table 1-3:

$$z = \frac{ch^2}{1+\sqrt{1-(1+k)c^2h^2}} + Ah^4 + Bh^6 + Ch^8 + Dh^{10} \quad (5)$$

TABLE 1-3

| Surface | K | A | B | C | D |
|---|---|---|---|---|---|
| 10 | 0.000E+00 | −8.214e−004 | 1.801e−005 | −8.047e−007 | 0.000E+00 |
| 11 | 0.000E+00 | −1.221e−004 | −4.714e−006 | −8.930e−008 | 0.000E+00 |

Figure 7:
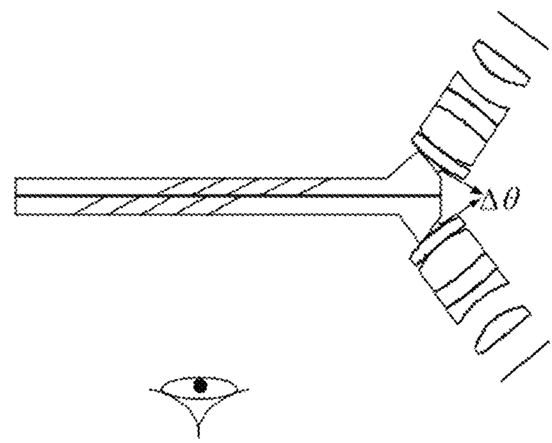
FIG. 7 illustrates an overall structure of a near-eye display apparatus comprising the waveguide optical element and the projection optical assembly of the first example.

FIG. 7 is an overall structure diagram of a near-eye display apparatus comprising two 0.39" OLEDs as micro-display elements, wherein the waveguide optical element of the first example and the projection optical assembly cooperate with each other. In the near-eye display apparatus of Example 1, two separate projection optical assemblies 16 are respectively used to adapt to the first and the second waveguide plates. The projection optical assemblies respectively have field angles of ±16° in the direction of YOZ. The included angle Δθ between the optical axis of the projection optical assembly and the incidence surface of the coupling incidence portion is 16°, which results in that the field of view of [−16°, 16°] of the light emergent from the projection optical assembly becomes [−32°, 0] and [0, 32°] after the light enters the first and the second waveguide plates, thereby achieving a field angle up to 64° in YOZ direction, an exit pupil distance of 20 mm, an exit pupil diameter of 10 mm, and a total thickness of two layers of waveguides less than or equal to 4 mm, so that a transmission-type NED with large field of view, light-thin profile, and high resolution is realized.

It is also possible to design a projection optical assembly having a field angle of ±32° (or between ±16° and ±32°) in YOZ direction, and then to achieve splicing of field angles by means of properly offsetting the center of the micro-displays away from the optical axis of the projection optical assembly as shown in FIG. 7.

Example 2

Figure 8:
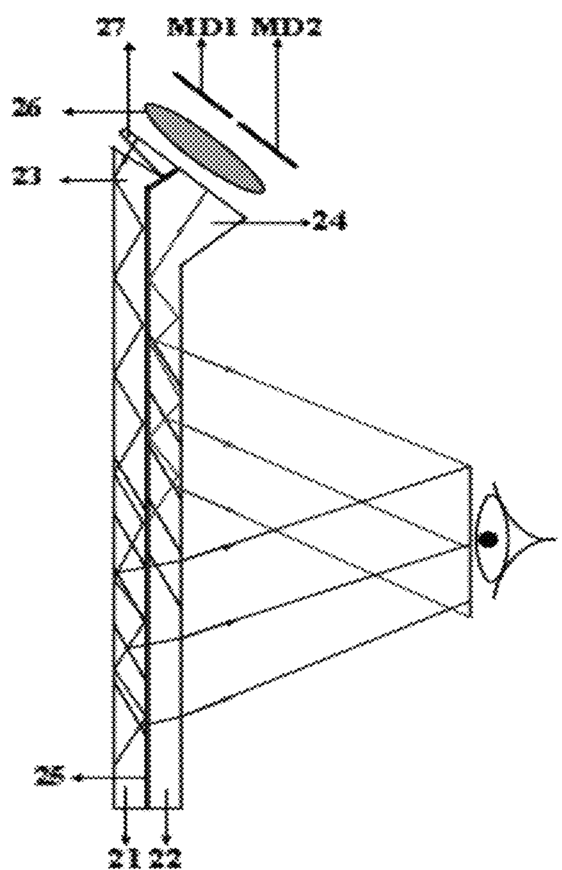
FIG. 8 is an optical path diagram of a waveguide optical element according to some embodiments of a second example.

FIG. 8 is an optical path diagram of a waveguide optical element of the second example. Same as Example 1, Example 2 adopts the solution of two layers of waveguide plates 21 and 22 placed in the manner of superposition, with a tiny air membrane layer 25 therebetween, each waveguide plate comprising five coupling exit beam-split surfaces, wherein the characteristic angle $\theta_1$ between the coupling exit beam-split surfaces and the main surface within the first waveguide plate 21 is relatively large, responsible for light beams within the field of view [0, FOV/2], while the characteristic angle $\theta_2$ between the coupling exit beam-split surfaces and the main surface within the second waveguide plate 22 is relatively small, responsible for beams within the field of view [−FOV/2, 0].

Regarding the double-layer waveguide optical elements of Example 2, the specific parameters can be as shown as in Table 2-1. Compared with Example 1, changes occur in the arrangement sequence of the waveguide plates, but consistent exit pupil diameter and field angle can be kept.

TABLE 2-1

| | Thickness d | θ | n | Air Gap | ERF | EPD | FOV |
|---|---|---|---|---|---|---|---|
| 1st waveguide plate 21 | 2.3 mm | 27° | 1.7 | 3.98 | 19 mm | 10 mm | 64° |
| 2nd waveguide plate 22 | 1.68 mm | 19° | 1.7 | | | | |

TABLE 2-1-continued

| | Thickness d | θ | n | Air Gap | ERF | EPD | FOV |
|---|---|---|---|---|---|---|---|

Figure 9:
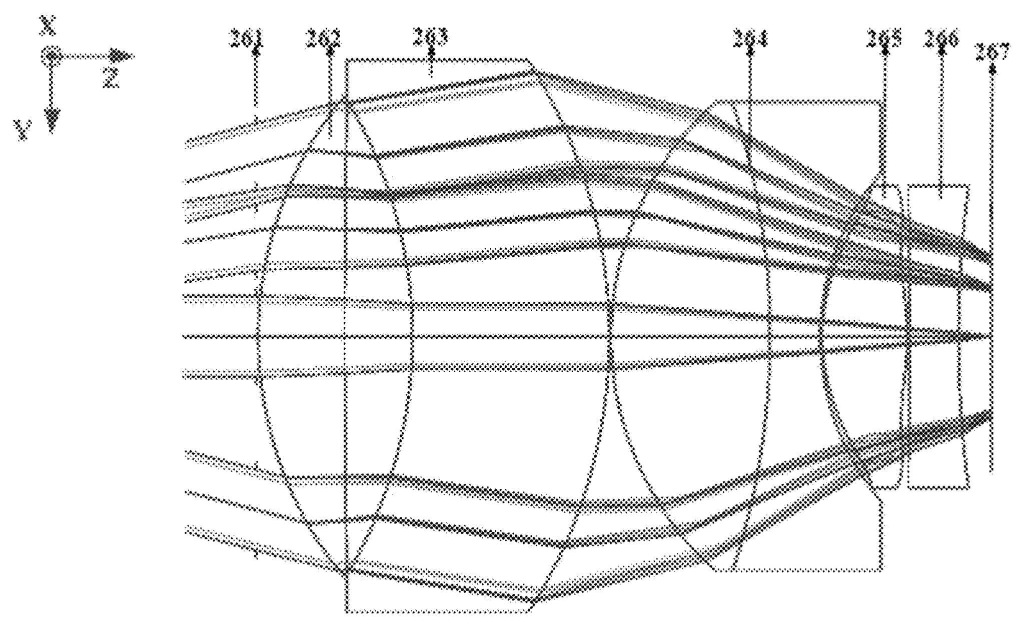
FIG. 9 is a diagram of a projection optical assembly adaptive to the second example.

In Example 2, the two layers of waveguide plates can share the same projection optical assembly 26. FIG. 9 is a diagram of the projection optical assembly 26 of Example 2, wherein the projection optical assembly 26, according to the field angle, is divided into two paths so as to respectively correspond to the two layers of waveguide plates 21 and 22. Furthermore, 261 indicates the exit pupil position of the projection optical assembly 26 in YOZ direction, i.e. the position of the clear aperture on the coupling incidence portions of the waveguide optical element; and light beams in the direction of YOZ need to ensure that the light beams at each field angle all can thoroughly fill the width of the clear aperture in horizontal direction. The projection optical assembly 26 comprises a lens 262, a lens 263, a lens 264, a lens 265, and a lens 266, wherein the lens 264 is a doublet lens, the lens 265 is an aspheric lens, the aspheric order is 10, a focal power of the lens 262 is positive, and image surface position is 267. With such projection optical assembly 26, the effective focal length can be up to 16.35 mm.

Parameters of each optical surface of the projection optical assembly according to Example 2 can be found in Tables 2-2 and 2-3 as below, and from the lens 262 to the image surface, surfaces of each lens are successively labeled as 3, 4, 5 . . .

TABLE 2-2

| Surface Sign | Surface Type | Radius | Thickness |
|---|---|---|---|
| Diaphragm XOZ | spherical | ∞ | 40.000 |

TABLE 2-2-continued

| Surface Sign | Surface Type | Radius | Thickness |
|---|---|---|---|
| Diaphragm YOZ | spherical | ∞ | 0.100 |
| 3 | spherical | 21.740 | 4.836 |
| 4 | spherical | 122.300 | 4.811 |
| 5 | spherical | −29.676 | 6.598 |
| 6 | spherical | −33.579 | 0.100 |
| 7 | spherical | 25.917 | 10.055 |
| 8 | spherical | −26.272 | 3.000 |
| 9 | spherical | 55.771 | 1.000 |
| 10 | aspheric | 13.245 | 4.860 |
| 11 | aspheric | −15.977 | 2.800 |
| 12 | spherical | 710.994 | 3.000 |
| 13 | spherical | 212.114 | 1.399 |
| Image | spherical | infinite | 0.000 |

In some embodiments, surfaces 10 and 11 are aspheric, the aspheric coefficients thereof shown in Table 2-3:

TABLE 2-3

| Surface | K | A | B | C | D |
|---|---|---|---|---|---|
| 10 | 0.000E+00 | −2.533e−004 | 6.552e−006 | −4.214e−008 | 1.790e−011 |
| 11 | 0.000E+00 | 1.371e−003 | −1.070e−005 | 2.513e−008 | −4.504e−012 |

Figure 10:
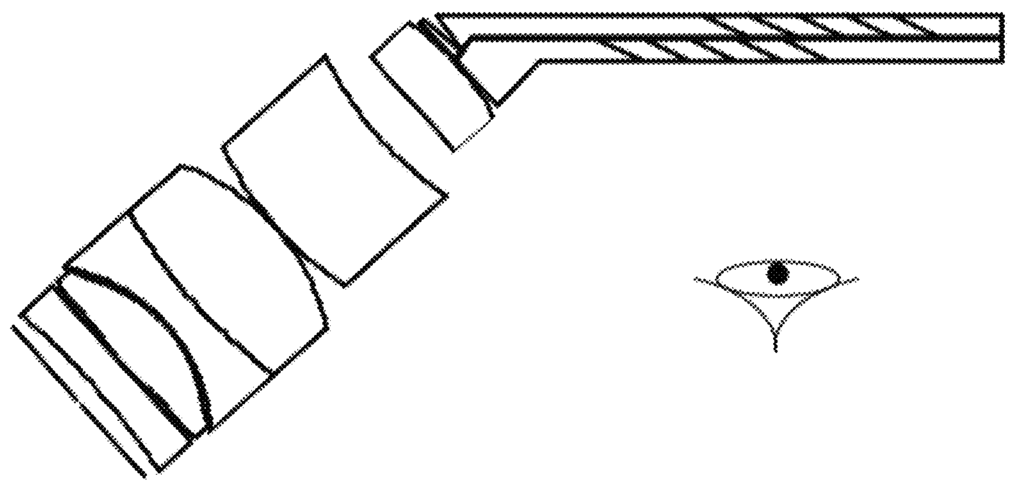
FIG. 10 illustrates an overall structure of a near-eye display apparatus comprising the waveguide optical element and the projection optical assembly of the second example.

FIG. 10 is an overall structure diagram of a near-eye display apparatus comprising two 0.7" OLEDs (or other proper large-size micro-displays) as micro-displays, wherein the waveguide optical element of the second example and the projection optical assembly cooperate with each other. The coupling incidence portions 23 and 24 of the two layers of the waveguide plates are oriented consistently so as to share the same projection optical assembly. Since the coupling incidence portions of the two layers of the waveguide plates need to meet the requirement of matching the exit beam-split surfaces, a certain angle exists between the incidence surfaces of the coupling incidence portions of the two layers of the waveguide plates. Under the circumstance of sharing the projection optical assembly, the exit pupil position 261 of the projection optical assembly in the YOZ direction overlaps with the coupling surface of the coupling incidence portion 24 of the second waveguide plate 22, the light beams within the field of view [−32°, 0] enter the second waveguide plate 22; and a deflecting prism 27 is provided between the coupling incidence portion 23 of the first waveguide plate 21 and the exit pupil of the projection optical assembly 26, then the light beams of the projection optical assembly within the field of view [0, 32°] enter the first waveguide plate 21 after being deflected by the deflecting prism 27, thereby meeting the requirement that the coupling incidence portion 23 of the first waveguide plate 21 makes for light coupling angle. Besides, the deflecting prism 27 may introduce certain wedge plate chromatic aberration.

As a variant, the waveguide optical element in Example 2 may also use two LCoS micro-displays to replace the above OLED micro-displays so as to form a near-eye display apparatus. Due to the demand of LCoS working principle, a PBS beam-split prism need to be added in front of the image surface, and corresponding adjustments need to be performed on the projection optical assembly.

Figure 11:
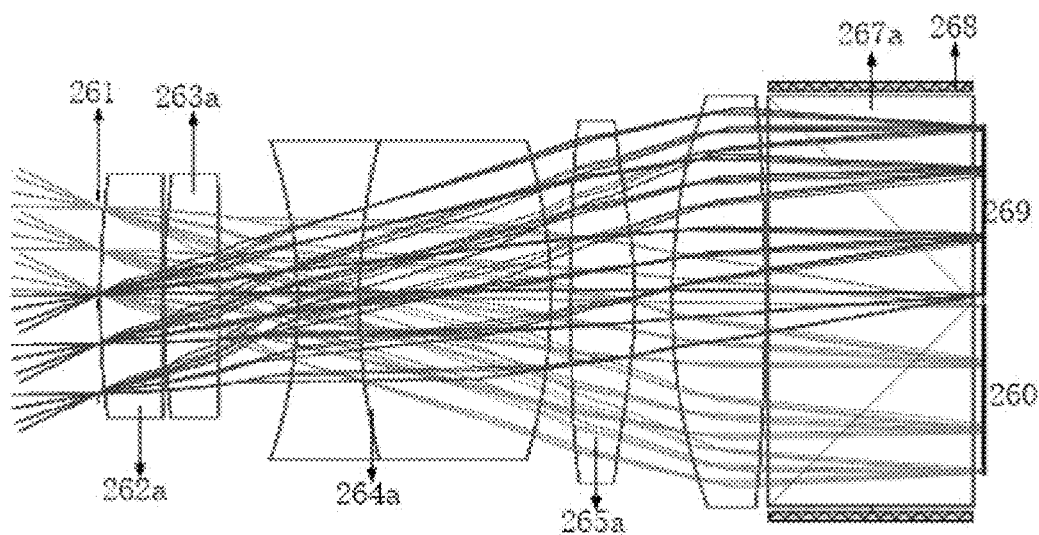
FIG. 11 is a diagram of an alternative projection optical assembly adaptive to the second example.

FIG. 11 is an optical path diagram of the projection optical assembly **26*a* using LCoS micro-displays to match the waveguide optical element in Example 2. The projection optical assembly comprises six lenses, i.e. 262*a*, 263*a*, 264*a*, 265*a*, 266*a*, and 267*a*, wherein the lens 264*a* is a doublet lens, the lens 265*a* is an aspheric lens, the aspheric order is 10, the LCoS module has a PBS beam-split prism 267*a*, a light source 268*a* and a light uniformization structure to provide illumination for LCoS, and image surface positions are 269*a*, and 260*a***.

Parameters of each optical surface of the projection optical assembly **26*a* using LCoS micro-displays can be found in Tables 3-1 and 3-2 as below, and from the lens 262*a* to the image surface, surfaces of each lens are successively labeled as 3, 4, 5** . . .

TABLE 3-1

| Surface Sign | Surface Type | Radius | Thickness |
|---|---|---|---|
| Diaphragm XOZ | spherical | infinite | 40.000 |
| Diaphragm YOZ | spherical | infinite | 0.100 |
| 3 | spherical | 46.082 | 2.576 |
| 4 | spherical | −255.910 | 0.100 |
| 5 | spherical | 514.121 | 2.407 |
| 6 | spherical | −50.154 | 3.146 |
| 7 | spherical | −20.869 | 2.500 |
| 8 | spherical | 39.424 | 9.513 |
| 9 | spherical | −24.813 | 1.000 |
| 10 | aspheric | 734.655 | 4.033 |
| 11 | aspheric | −19.180 | 1.800 |
| 12 | spherical | 26.625 | 5.760 |
| 13 | spherical | −146.889 | 0.100 |
| 14 | spherical | ∞ | 10.000 |
| 15 | spherical | ∞ | 0.500 |
| Image | spherical | ∞ | 0.000 |

In some embodiments, surfaces 10 and 11 are aspheric, the aspheric coefficients thereof shown in Table 3-2.

TABLE 3-2

| Surface | K | A | B | C | D |
|---|---|---|---|---|---|
| 10 | 0.000E+00 | 5.110e−005 | −7.201e−008 | −1.805e−010 | 0.000E+00 |
| 11 | 0.000E+00 | 1.730e−004 | −4.288e−007 | 5.091e−010 | 0.000E+00 |

Figure 12:
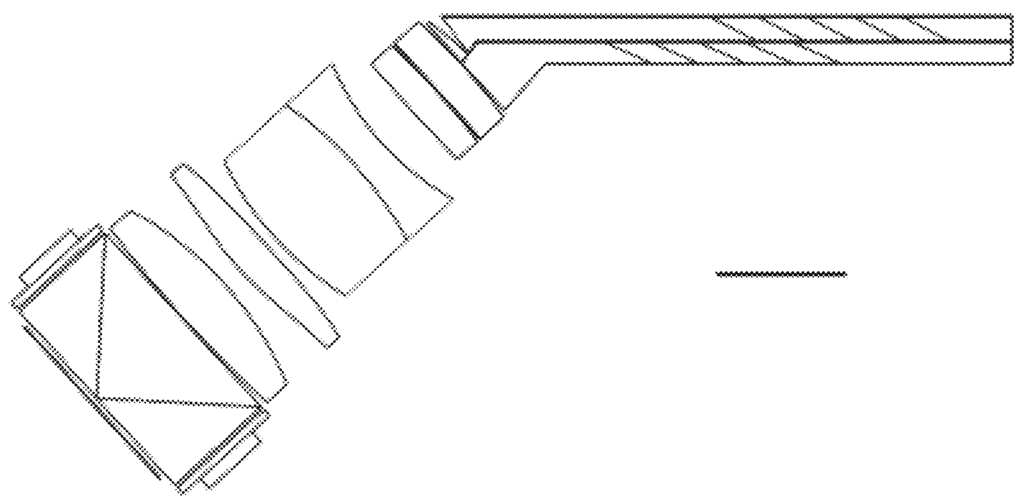
FIG. 12 illustrates an overall structure of a near-eye display apparatus comprising the waveguide optical element and the alternative projection optical assembly of the second example.

FIG. 12 is an overall structure diagram of a near-eye display apparatus comprising two 0.44" LCoSs as micro-displays, wherein the waveguide optical element of the second example and the projection optical assembly cooperate with each other. Wherein the two layers of the waveguide plates are oriented consistently so as to share the same projection optical assembly. Just as same as using OLEDs as the micro-display, a deflecting prism 27 is provided between the coupling incidence portion of the first waveguide plate and the projection optical assembly, then the light beams of the projection optical assembly within the field of view [0, 32°] enter the first waveguide plate 21 after being deflected. Since the waveguide optical element structure is not affected by the projection optical element, the NED using an LCoS micro-display can likewise have a field angle up to 64°.

Example 3

Figure 13:
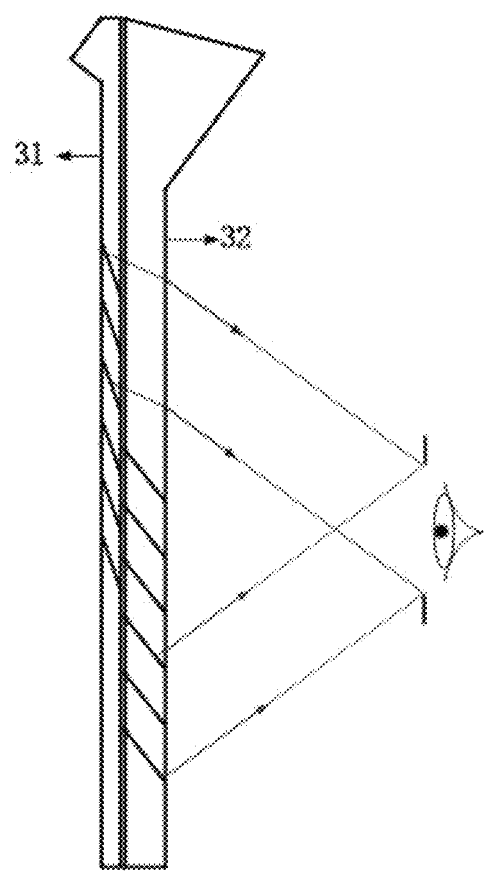
FIG. 13 is an optical path diagram of a waveguide optical element according to some embodiments in a third example.

FIG. 13 is a structure diagram of a waveguide optical element according to the third example, wherein there are two layers of waveguide plate elements, and the number of the beam-split surfaces inside each waveguide plate is six.

Further, what is different from Examples 1 and 2 is that the characteristic angle $\theta_1$ of the beam-split surfaces of the first waveguide plate 31 is relatively small, preferably smaller than 30°, responsible for light beams within the field of view [−36°, 0]; while the characteristic angle of the beam-split surfaces of the second waveguide plate 32 is relatively large, preferably larger than 30°, responsible for light beams within the field of view [0, 36°].

Due to the relatively large difference between the characteristic angles of the beam-split surfaces, accordingly, thicknesses of the first and the second waveguide plates and dimensions of the corresponding coupling incidence portions need be adaptive to the characteristic angles.

Specifically, as shown in FIG. 13, the coupling incidence portions of the first and the second waveguide plates are oriented in different directions, and have significantly different exterior dimensions, the coupling incidence portion of the second waveguide plate 32 is larger than that of the first waveguide plate 31 in dimension.

Corresponding structure parameters of the two-layer waveguide optical elements can be found in Table 4-1. As such, working with a corresponding projection optical assembly, e.g. one comprising at least four lenses, it may achieve a field angle up to ±36° in the direction of waveguide expansion (Y direction).

TABLE 4-1

| | d | θ | n | Air Gap | D | ERF | EPD | FOV |
|---|---|---|---|---|---|---|---|---|
| 1st waveguide plate 31 | 1.55 mm | 18° | 1.7 | 0.05 mm | 5.00 mm | 20 mm | 10 mm | 72° |
| 2nd waveguide plate 32 | 3.4 mm | 38° | 1.7 | | | | | |

Example 4

Figure 14:
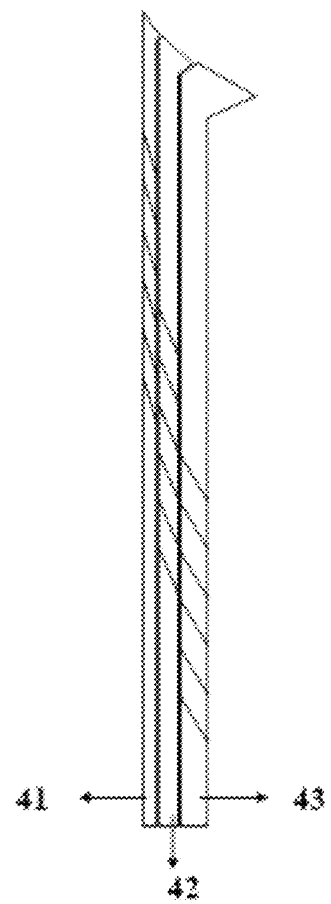
FIG. 14 is an optical path diagram of a waveguide optical element according to some embodiments in a fourth example.

FIG. 14 depicts a waveguide optical element according to the fourth example, wherein the waveguide optical element comprises three layers of waveguide plates placed in the manner of superposition with each other. And identical with the previous examples, each waveguide plate comprises two main surfaces parallel to each other, meanwhile all the main surfaces are mutually parallel, and each waveguide plate is attached with a coupling incidence portion.

In this example, the coupling incidence portions are located on the same side of the waveguide plates and protrude from the waveguide plates in the same direction to facilitate the arrangement. The main surfaces of all waveguide plates are parallel to each other, and a tiny air layer in a predetermined gap exists between adjacent main surfaces, e.g. 0.01 mm. Further, there are multiple coupling exit beam-split surfaces inside each waveguide plate; preferably, the beam-split surfaces inside the same one waveguide are uniformly distributed at an equal interval so as to facilitate processing and manufacturing as well as reducing cost.

In Example 4, the number of the coupling exit beam-split surfaces inside each waveguide plate are six, and the layers of the waveguide plates are different in thickness. In the exemplary mode as shown in FIG. 14, the waveguide plate 41 faraway from the exit pupil side has the smallest thickness, while the waveguide plate 43 close to the exit pupil side has the largest thickness. Correspondingly, the characteristic angles of the beam-split surfaces mentioned above also have a distribution matching with the thicknesses of the layers of waveguides, that is, the characteristic angle of the beam-split surfaces inside the waveguide plate 41 faraway from the exit pupil side being the smallest, the waveguide plate 43 close to the exit pupil side having the largest characteristic angle, and the characteristic angle of the beam-split surfaces of the middle layer of waveguide plate 42 being medium. The middle layer of the waveguide plate may extend the value range of the characteristic angles of the beam-split surfaces, so that the waveguide optical element can have a larger field angle.

As same as the previous examples, since multiple coupling exit beam-split surfaces are required to couple the light beams to exit, to achieve uniformity of emergent images, again adopted is the solution of coating a beam-split membrane on each beam-split surface, and gradually increasing reflectivity of the beam-split membranes, thereby effectively improving uniformity of illumination brightness within the exit pupil range. Structure parameters of an exemplary three layers of waveguide plates can be found in the Table 4-2 as below, the field angle being up to ±45° in the direction of waveguide expansion (Y direction).

TABLE 4-2

| | d | θ | n | D | ERF | EPD | FOV |
|---|---|---|---|---|---|---|---|
| waveguide plate 41 | 1.24 mm | 17° | 1.72 | 5.00 mm (including two gaps of 0.01) | 18 mm | 10 mm | 90° |
| waveguide plate 42 | 1.6 mm | 23° | 1.72 | | | | |
| waveguide plate 43 | 2.15 mm | 30° | 1.72 | | | | |

Wherein the beam-split surfaces inside the waveguide plate 41 faraway from the exit pupil side are distributed on the closest end from the coupling incidence portion in Y direction, responsible for light beams within the field of view [−45°, −16°]; the beam-split surfaces inside the waveguide plate 43 close to the exit pupil side are distributed on the farthest end from the coupling incidence portion in Y direction, responsible for light beams within the field of view [16°, 45°]; and the beam-split surfaces of the middle layer of waveguide plate 42 are distributed between the distribution areas of the above two groups of beam-split surfaces, responsible for light beams within the field of view [−16°, 16°].

In the waveguide optical element formed with three layers of waveguide plates placed in the manner of superposition as shown in FIG. 14, since there are the three layers of waveguide plates, the two main surfaces of the middle layer of waveguide plate are contained between the waveguide plate layers, and the coupling incidence portions cannot be provided on separate sides easily.

As such, in some embodiments, preferably a coupling incidence portion can be attached to an end surface of the waveguide plates which is not the main surface; or in a simpler fashion, the coupling incidence portions corresponding to the layers of waveguide plates are integrated together with the corresponding waveguide plate layer.

Distinguished from the previous examples, the three integral coupling incidence portions are located on one side and have a quasi-wedge shape and have continuous incident-light surfaces, so as to be adaptive to the requirement of the exit aperture of one set of projection optical assembly. Correspondingly, image light of one micro-display can be coupled into respective layers of waveguide plates.

Considering the interrelations of positions and features of incident-light surfaces of the three coupling incidence portions, the projection optical assembly suitable for the three layers of superposed waveguide plates can hardly be adapted to conventional modes of multiple lenses. Preferably, a mode of scan projection can be adopted, for example, a laser scanning projection optical assembly can form a coupling incidence portion for the present example.

Although a three-layer waveguide corresponding to different field angles can be achieved through the waveguide plates with different thickness and with the same number of the beam-split surfaces in the above embodiment, those skilled in the art can understand that the waveguide plates with identical thickness and having different numbers of beam-split surfaces can achieve a three-layer waveguide corresponding to different field angles as well, and the number of beam-split surfaces matches the field angle that the waveguide plate need to be responsible for.

However, affected by the thickness of a waveguide plate, at the time of achieving uniform emergent light distribution, it is not advisable that the number of beam-split surfaces is too small, and it is not possible to bear more beam-split surfaces within the vision coverage, either. Thus, the preferable number of beam-split surfaces inside each layer of waveguide plate generally is 5-7.

Multiple matches of projection optical assembly and waveguide optical element, as illustrated in the above embodiments, constitute examples of a near-eye display apparatus, but the invention is not limited to the match modes in each example. For example, the projection optical assembly in Example 1 also can be applied to waveguide optical elements in other examples, which just requires corresponding adjustments to the parameters of the lens; and the projection optical assembly shared by the two layers of waveguide plates in Example 2 also can be applied to the three layers of waveguide plate in Example 5, which just requires corresponding adjustments to the surface type and aperture of some lenses in the projection optical assembly. Namely, the waveguide optical element does not limit the form of the projection optical assembly, and any device can form the projection optical assembly according to various embodiments of the present disclosure if it can project light into the waveguide optical element so as to satisfy the condition of the light having total internal reflection in the waveguide optical element.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A waveguide optical element, comprising:

at least two waveguide plates arranged to overlap in parallel, with a predetermined gap therebetween, each waveguide plate comprising two main surfaces parallel to each other, and configured to transmit light coupled into the waveguide plates in a predetermined direction through total internal reflection; and one or more partially reflective surfaces respectively located inside each of the waveguide plates, and arranged within a space between the main surfaces as a beam-split surface at a characteristic angle with the main surfaces;

wherein the one or more partially reflective surfaces inside the waveguide plates are distributed in different areas along the direction of the main surfaces; and wherein there are a plurality of the partially reflective surfaces inside each of the waveguide plates, and numbers of the partially reflective surfaces inside each of the waveguide plates are identical or different.

2. The waveguide optical element according to claim 1, wherein the plurality of the partially reflective surfaces are distributed uniformly in a predetermined distribution area.

3. The waveguide optical element according to claim 2, wherein a distance $P_{AB}$ between an upper boundary point A of the partially reflective surfaces in one of the waveguide plates and a lower boundary point B of the partially reflective surfaces in another waveguide plate along the direction of the main surfaces of the waveguide plates satisfies a following formula:

$$P_{AB} \geq EPD + 2ERF \times \tan(FOV/2) + \frac{D}{n}\tan(FOV/2)$$

wherein EPD is an exit pupil diameter, ERF is an exit pupil distance, FOV is a field angle that may be achieved by the waveguide optical element, n is a refractivity of the waveguide plate, and D is a thickness of the waveguide optical element.

4. The waveguide optical element according to claim 2, further comprising coupling incidence portions integral with or combined with the waveguide plates into a whole, the coupling incidence portions are configured to deflect light beams toward the waveguide plates such that light entering the waveguide plates satisfies an incidence condition of total internal reflection.

5. The waveguide optical element according to claim 4, wherein the coupling incidence portions are located on a same side of the respective waveguide plates, and protrude from the waveguide plates in a same direction; alternatively, the coupling incidence portions are located on different sides of the respective waveguide plates, and protrude from the waveguide plates in different directions.

6. The waveguide optical element according to claim 4, wherein dimensions of the coupling incidence portions of a first waveguide plate and a second waveguide plate fit their own characteristic angles.

7. The waveguide optical element according to claim 4, wherein the coupling incidence portions include a deflecting prism.

8. The waveguide optical element according to claim 4, wherein the characteristic angles in the waveguide plates are less than 30°.

9. The waveguide optical element according to claim 4, wherein a total thickness of the waveguide optical element is no more than 5 mm.

10. The waveguide optical element according to claim 1, wherein a characteristic angles θ1 is formed between the partially reflective surface and the main surfaces in a first waveguide plate, and a characteristic angles $\theta_2$ is formed between the partially reflective surface and the main surfaces in a second waveguide plate, $\theta_1 \neq \theta_2$.

11. The waveguide optical element according to claim 10, wherein a waveguide plate distal from an exit pupil side has a smallest thickness, while a waveguide plate proximal to the exit pupil side has a largest thickness, and a distribution of characteristic angles of the beam-split surfaces in the waveguide plates match thicknesses of the respective waveguide plates.

12. The waveguide optical element according to claim 1, wherein the plurality of the partially reflective surfaces have different reflectivity to ensure that light exiting from the waveguide plates has a substantially uniform distribution of intensity in a predetermined area, the reflectivity of adjacent partially reflective surfaces meets the following formula:

$$R_N = \frac{R_{N-1}}{1 - R_{N-1}}$$

wherein N is a sequence number of the partially reflective surfaces, $R_1$ is reflectivity of the partially reflective surface closest to the coupling incidence portion.

13. The waveguide optical element according to claim 12, wherein number of the beam-split surfaces in each waveguide plate is 5-7.

14. A near-eye display apparatus, comprising:

a waveguide optical element, comprising:

at least two waveguide plates arranged to overlap in parallel, with a predetermined gap therebetween, each waveguide plate comprising two main surfaces parallel to each other, and transmitting light coupled into the waveguide plates in a predetermined direction through total internal reflection; and one or more partially reflective surfaces respectively located inside each of the waveguide plates, and arranged within a space between the main surfaces as a beam-split surface at a characteristic angle with the main surfaces; wherein the one or more partially reflective surfaces inside the waveguide plates are distributed in different areas along the direction of the main surfaces;

a projection optical assembly; and a micro-display, wherein the projection optical assembly is configured to project image light emitted from the micro-display to the waveguide optical element, so as to transmit in the waveguide optical element;

wherein a characteristic angles $\theta_1$ is formed between the partially reflective surface and the main surfaces in a first waveguide plate, and a characteristic angles $\theta_2$ is formed between the partially reflective surface and the main surfaces in a second waveguide plate, $\theta_1 \neq \theta_2$.

15. The near-eye display apparatus according to claim 14, wherein the at least two waveguide plates share a same projection optical assembly, or different waveguide plates respectively match with different projection optical assemblies.

16. The near-eye display apparatus according to claim 15, wherein the projection optical assembly at least has four lenses, the at least four lenses include a doublet lens and an aspheric lens.

17. The near-eye display apparatus according to claim 15, wherein the projection optical assembly is a laser scanning projection optical assembly.

18. The near-eye display apparatus according to claim 14, where the micro-display comprises one of LCD, OLED, LCoS, or DLP micro-displays.

19. A method of displaying augmented reality (AR) or virtual reality (VR) images with a wearable display apparatus, the method comprising:

receiving images;

projecting the images to a waveguide optical element through a projection optical assembly, wherein the waveguide optical element includes at least two waveguide plates arranged to overlap in parallel with a predetermined gap therebetween; and at least one partially reflective surface respectively located inside each of the waveguide plates, the partially reflective surfaces inside the waveguide plates are distributed in different areas in the respective waveguide plates; and coupling light of the images through the partially reflective surfaces to exit to an exit pupil position of the waveguide optical element;

wherein there are a plurality of the partially reflective surfaces inside each of the waveguide plates, and numbers of the partially reflective surfaces inside each of the waveguide plates are identical or different.

* * * * *